(12) United States Patent
Jackson et al.

(10) Patent No.: US 11,555,512 B2
(45) Date of Patent: Jan. 17, 2023

(54) CONNECTOR

(71) Applicants: David George Jackson, Mississauga (CA); Barry Walter Jackson, Mississauga (CA)

(72) Inventors: David George Jackson, Mississauga (CA); Barry Walter Jackson, Mississauga (CA)

(*) Notice: Subject to any disclaimer, the term of this patent is extended or adjusted under 35 U.S.C. 154(b) by 259 days.

(21) Appl. No.: 16/452,755

(22) Filed: Jun. 26, 2019

(65) Prior Publication Data

US 2019/0390696 A1   Dec. 26, 2019

Related U.S. Application Data

(60) Provisional application No. 62/689,921, filed on Jun. 26, 2018.

(51) Int. Cl.
*E04G 7/34* (2006.01)
*F16B 9/02* (2006.01)
*E04G 7/02* (2006.01)

(52) U.S. Cl.
CPC .............. *F16B 9/02* (2013.01); *E04G 7/02* (2013.01); *E04G 7/34* (2013.01); *Y10T 403/30* (2015.01); *Y10T 403/608* (2015.01)

(58) Field of Classification Search
CPC ............ Y10T 403/60; Y10T 403/602; Y10T 403/604; Y10T 403/606; Y10T 403/608; Y10T 24/44026; Y10T 403/30; Y10T 24/45508; E04G 7/02; E04G 7/12; E04G 7/30; E04G 7/301; E04G 7/302; E04G 7/303; E04G 7/304; E04G 7/305; E04G 7/34; F16B 2/18; F16B 5/06; F16B 5/0607; F16B 5/0621; F16B 13/04; F16B 13/0808

USPC ..... 403/49; 411/341, 342; 182/186.8, 186.7, 182/178

See application file for complete search history.

(56) References Cited

U.S. PATENT DOCUMENTS

| | | | | |
|---|---|---|---|---|
| 624,080 | A | * | 5/1899 | Pease .................. E05B 15/0093 292/230 |
| 624,969 | A | * | 5/1899 | Peterson ............. F16B 13/0808 411/340 |
| 691,050 | A | * | 1/1902 | Dronne .................. F16B 21/18 403/327 |

(Continued)

FOREIGN PATENT DOCUMENTS

| | | |
|---|---|---|
| CA | 650749 A | 10/1962 |
| CA | 700184 A | 12/1964 |

(Continued)

*Primary Examiner* — Michael P Ferguson
(74) *Attorney, Agent, or Firm* — Bereskin & Parr LLP/S.E.N.C.R.L., s.r.l.

(57) ABSTRACT

A connector for interlocking components of scaffolding or other supporting structures for building forms. The connector includes a body having an internal chamber bounded laterally by planar first and second surfaces. A lever is seated in the chamber laterally intermediate and in close fit with the planar first and second surfaces for inhibiting lateral movement of the lever. The lever is movable between a lock position and a release position. A spring is seated in the chamber laterally intermediate and in close fit with the planar first and second surfaces for inhibiting lateral movement of the spring, the spring for biasing the lever into the lock position.

11 Claims, 4 Drawing Sheets

(56) References Cited

U.S. PATENT DOCUMENTS

| | | | | |
|---|---|---|---|---|
| 745,728 A * | 12/1903 | Jung | F16B 13/0808 411/342 |
| 1,041,184 A * | 10/1912 | Spiro | F16B 21/18 403/327 |
| 1,077,006 A * | 10/1913 | Smith | F16B 13/0808 411/345 |
| 1,349,344 A * | 8/1920 | O'neill | F16B 21/125 411/342 |
| 1,409,626 A * | 3/1922 | Walther | F16B 21/12 411/345 |
| 1,516,347 A * | 11/1924 | Pataky | F16B 21/10 411/340 |
| 1,950,290 A * | 3/1934 | Benson | F16B 21/10 182/113 |
| 2,473,388 A * | 6/1949 | Rambo | E21B 17/046 403/292 |
| 2,698,552 A * | 1/1955 | Smith | F16B 21/10 411/345 |
| 2,701,167 A * | 2/1955 | Kirkpatrick | E04G 7/305 52/645 |
| 2,775,154 A * | 12/1956 | Leaphart, Sr. | F16B 21/10 411/341 |
| 2,810,612 A * | 10/1957 | Daniel | E04G 7/305 403/49 |
| 2,847,259 A * | 8/1958 | Beatty | E04G 7/305 24/611 |
| 2,961,259 A * | 11/1960 | Heaphy | E04G 7/305 403/49 |
| 3,026,135 A * | 3/1962 | Tomkinson | E05B 65/52 292/304 |
| 3,091,485 A * | 5/1963 | Jackson | E04G 7/305 403/49 |
| 3,877,825 A * | 4/1975 | Roux | E04G 7/304 403/233 |
| 3,944,153 A * | 3/1976 | Linker | B65H 54/54 242/597.3 |
| 4,004,393 A * | 1/1977 | Morris | E04G 7/305 52/637 |
| 4,188,143 A * | 2/1980 | Matsuura | E04G 7/305 403/317 |
| 4,194,849 A * | 3/1980 | Matsuura | E04G 7/305 403/317 |
| 4,348,790 A * | 9/1982 | Kuramoto | E04G 7/305 24/601.5 |
| 4,430,019 A * | 2/1984 | D'Alessio | E04G 7/26 182/178.1 |
| 4,470,574 A | 9/1984 | Jackson | |
| 4,630,956 A * | 12/1986 | Gilbreath | E04G 7/305 403/49 |
| 5,112,155 A * | 5/1992 | Jackson | E04G 7/305 403/49 |
| 5,400,870 A * | 3/1995 | Inoue | E04G 7/301 182/178.6 |
| 6,059,258 A | 5/2000 | Jackson | |
| 6,062,341 A * | 5/2000 | Frank | E04G 5/00 182/113 |
| 6,202,788 B1 * | 3/2001 | Busch | E04G 7/305 182/186.8 |
| 7,032,268 B2 | 4/2006 | Jackson | |
| 7,159,262 B2 | 1/2007 | Jackson | |
| 7,360,341 B2 | 4/2008 | Jackson et al. | |
| 2019/0106891 A1 | 4/2019 | Jackson | |
| 2019/0226165 A1 | 7/2019 | Jackson | |

FOREIGN PATENT DOCUMENTS

| | | | |
|---|---|---|---|
| CA | 2122736 A1 | 5/1993 | |
| CN | 1662717 A | 8/2005 | |
| GB | 856561 A * | 12/1960 | E04G 7/305 |
| WO | 9309311 A1 | 5/1993 | |

* cited by examiner

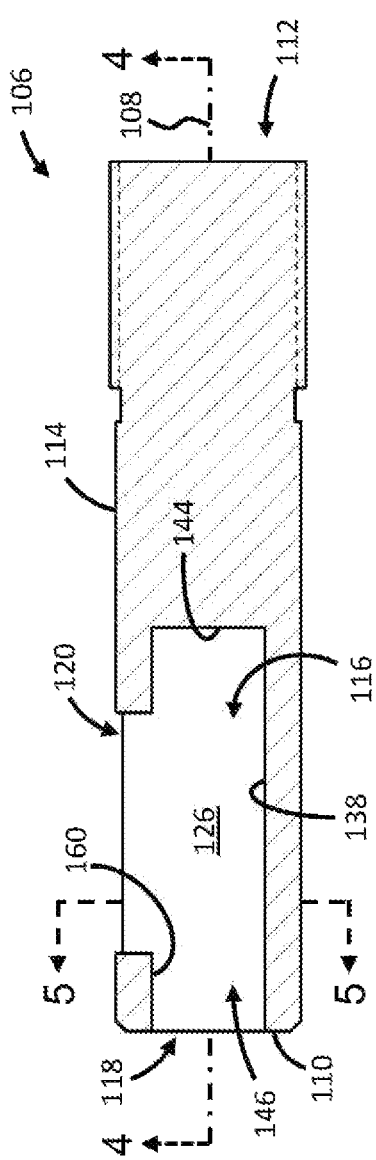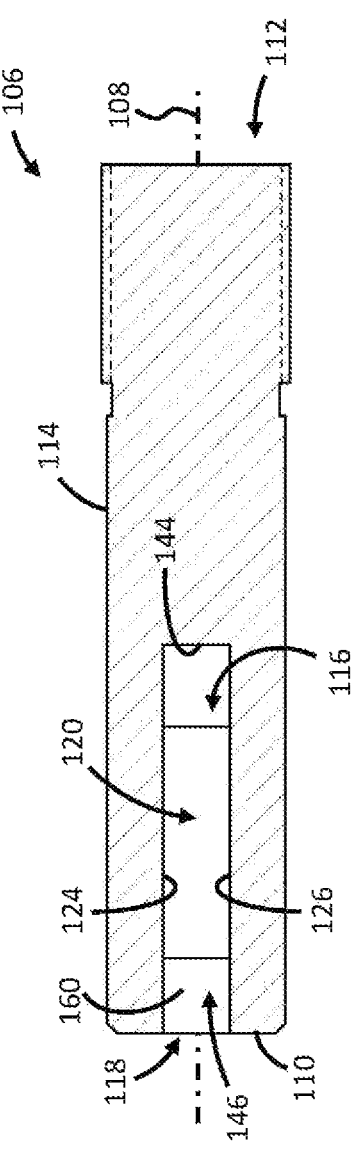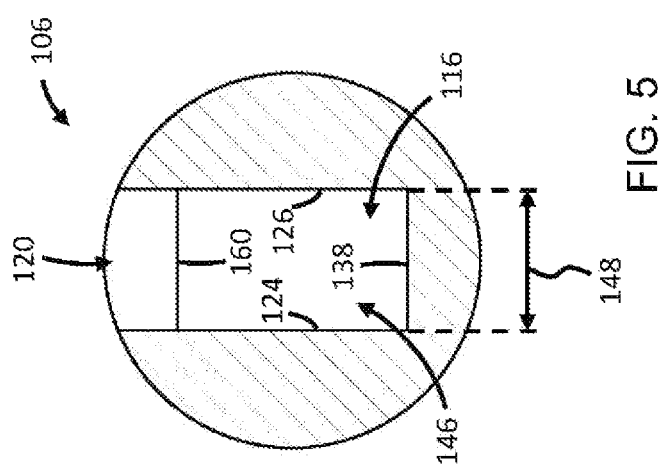

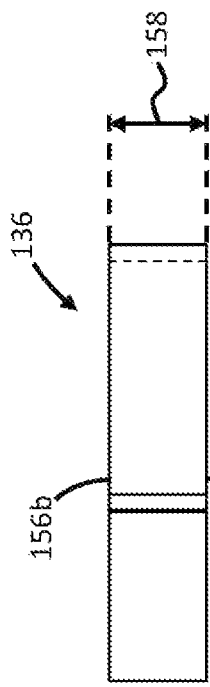
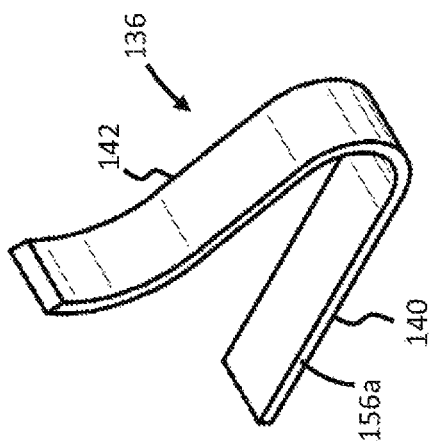
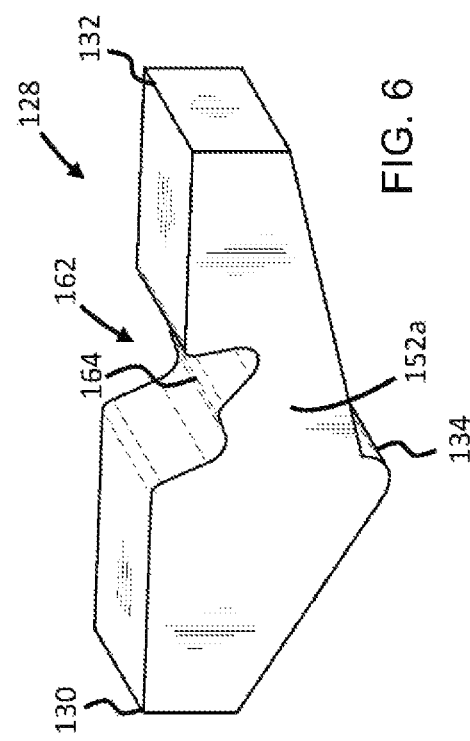
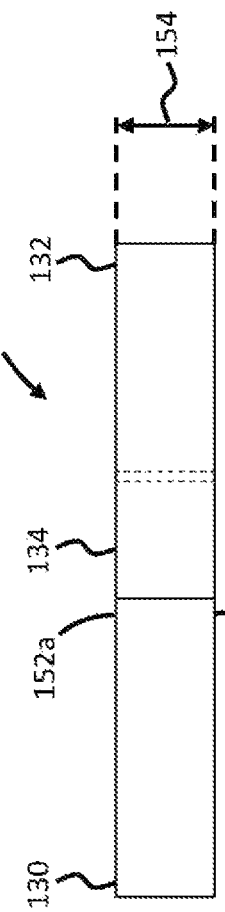

CONNECTOR

CROSS-REFERENCE TO RELATED APPLICATION

This application claims priority to U.S. Provisional Application No. 62/689,921 filed on Jun. 26, 2019, the entire contents of which are hereby incorporated herein by reference.

FIELD

The present disclosure relates generally to scaffolding and other supporting structures for building forms, and more specifically to a connector for interlocking components thereof.

BACKGROUND

The following paragraphs are not an admission that anything discussed in them is prior art or part of the knowledge of persons skilled in the art.

Canadian Application Nos. 650,749 and 700,184 and U.S. Pat. No. 3,091,485 disclose locking brackets for scaffolding brace bars.

U.S. Pat. No. 4,470,574 discloses a support structure for building forms, including a fast acting connector for securing ends of braces to tower legs.

Canadian Application No. 2,122,736 and U.S. Pat. No. 5,112,155 disclose a connector for assembling components of scaffolding.

INTRODUCTION

The following summary is intended to introduce the reader to various aspects of the applicant's teaching, but not to define any invention.

According to some aspects of the present disclosure, a connector for interlocking components may include a body extending along a longitudinal axis. The body may include a front surface, a rear end axially opposite the front surface for mounting to a first component, a radially outer surface extending along the axis between the front surface and the rear end for supporting a second component, and an internal chamber having a first entry open to the front surface and a second entry open to the outer surface. The chamber may be bounded laterally by a planar first surface and a planar second surface spaced laterally apart from the planar first surface. A lever may be seated in the chamber. The lever may include a tab projecting out from the first entry and a latch adjacent the second entry, the tab movable relative to the body for pivoting the lever between a lock position in which the latch projects radially out from the second entry for retaining the second component axially intermediate the latch and the rear end of the body, and a release position in which the latch is retracted into the chamber for permitting sliding of the second component past the latch. The lever may include a central portion extending through the chamber between the tab and the latch, the central portion laterally intermediate and in close fit with the planar first and second surfaces for inhibiting lateral movement of the lever. A spring may be seated in the chamber for biasing the lever into the lock position, the spring laterally intermediate and in close fit with the planar first and second surfaces for inhibiting lateral movement of the spring.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIG. 3 is a sectional view of the body of FIG. 2, taken along line 3-3 of FIG. 2;

FIG. 4 is a sectional view of the body of FIG. 2, taken along line 4-4 of FIG. 3;

FIG. 5 is a sectional view of the body of FIG. 2, taken along line 5-5 of FIG. 3;

FIG. 6 is a perspective view of a lever of the connector of FIG. 1;

FIG. 6A is a bottom view of the lever of FIG. 6;

FIG. 7 is a perspective view of a spring of the connector of FIG. 1; and FIG. 7A is a top view of the spring of FIG. 7.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
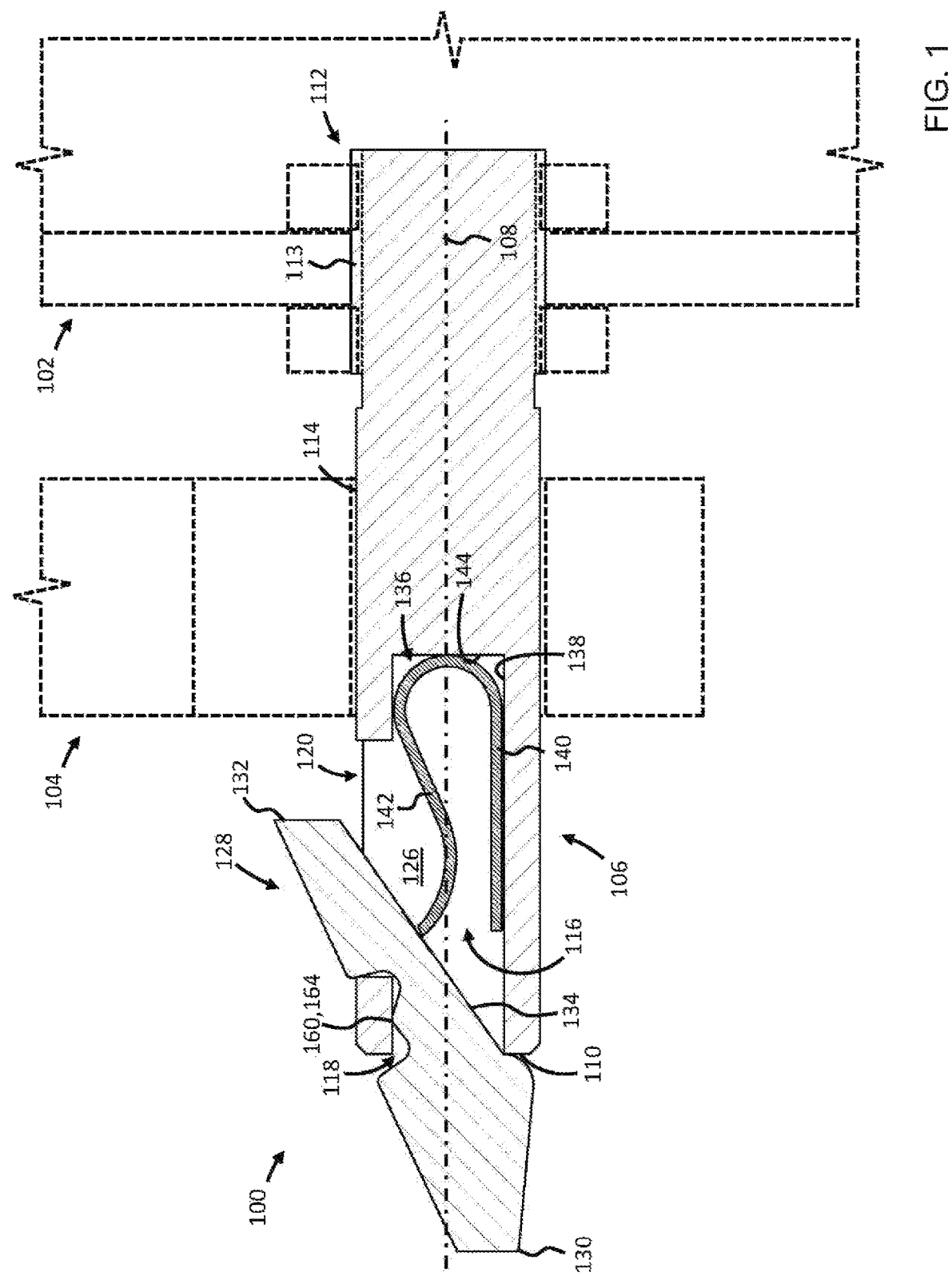
FIG. 1 is a side sectional view of an example connector.
Figure 2:
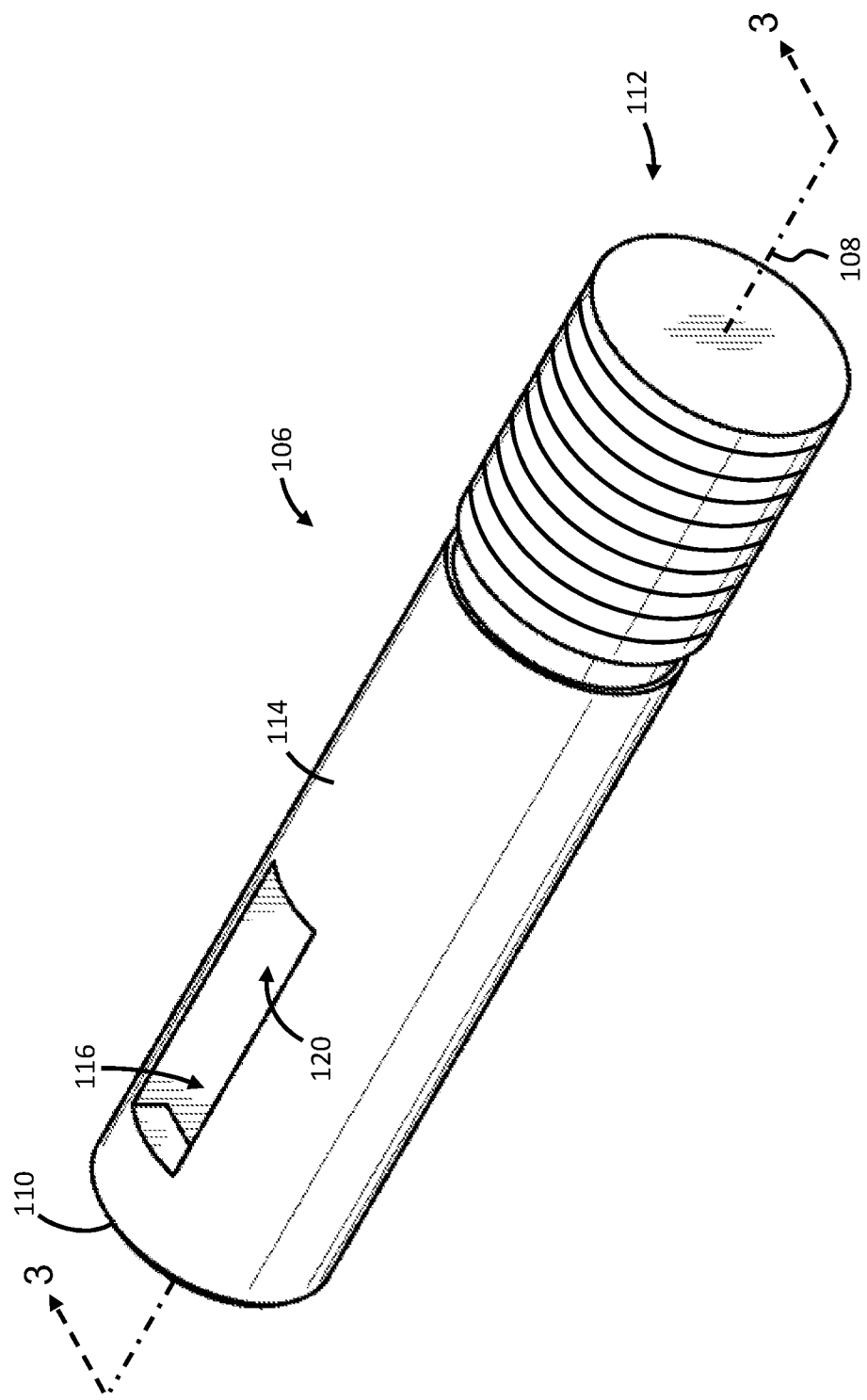
FIG. 2 is a perspective view of a body of the connector of FIG. 1.

Referring to FIGS. 1 and 2, an example connector 100 is shown. The connector 100 may be used for interlocking components of scaffolding or other supporting structures for building forms.

In the example illustrated, the connector 100 includes a body 106 extending along a longitudinal axis 108. The body 106 has a front surface 110 and a rear end 112 axially opposite the front surface 110 for mounting to a first scaffolding component 102. The first scaffolding component 102 can include, for example, a scaffolding frame. In the example illustrated, the body 106 is generally cylindrical, and includes an externally threaded portion 113 at the rear end 112 to facilitate mounting the connector 100 to the first scaffolding component 102.

In the example illustrated, the body 106 has a radially outer surface 114 extending along the axis 108 from the front surface 110 toward the rear end 112 for supporting a second scaffolding component 104. The second scaffolding component 104 can include, for example, a scaffolding brace having an aperture sized to slidably receive the body 106.

Referring to FIGS. 3 and 4, in the example illustrated, the body 106 includes an internal chamber 116 having a first entry 118 open to the front surface 110 and a second entry 120 open to the outer surface 114. In the example illustrated, the second entry 120 is spaced axially apart from the front surface 110 of the body 106.

Referring to FIGS. 4 and 5, in the example illustrated, the chamber 116 is bounded laterally by a planar first surface 124 and a planar second surface 126 spaced laterally apart from and generally parallel with the planar first surface 124.

Referring again to FIG. 1, in the example illustrated, the connector 100 includes a lever 128 seated in the chamber 116. The lever 128 has a tab 130 projecting out from the first entry 118 and a latch 132 adjacent the second entry 120. The tab 130 is movable relative to the body 106 for pivoting the lever 128 between a lock position (shown in FIG. 1) and a release position. When the lever 128 is in the lock position, the latch 132 projects radially out from the second entry 120 for retaining the second scaffolding component 104 axially intermediate the latch 132 and the first scaffolding component 102. When the lever 128 is in the release position, the latch 132 is retracted into the chamber 116 for permitting sliding of the second scaffolding component 104 past the latch 132. In the example illustrated, the tab 130 is movable upwards relative to the body 106 for pivoting the lever 128 from the lock position to the release position to retract the latch 132.

With continued reference to FIG. 1, in the example illustrated, the lever includes a central portion 134 extending through the chamber 116 between the tab 130 and the latch 132. The central portion 134 is laterally intermediate and in close fit with the planar first surface (FIG. 4) and the planar second surface 126 for inhibiting lateral movement of the lever 128 (e.g., for inhibiting lateral translation of the lever 128 and/or pivoting of the lever 128 about a horizontal axis parallel to the axis 108). This may help maintain a proper orientation of the lever 128, and may help reduce lateral movement of the lever 128 relative to, for example, connectors having a lever positioned in a cylindrical bore.

In the example illustrated, the connector 100 further includes a spring 136 seated in the chamber 116 for biasing the lever 128 into the lock position. In the example illustrated, the spring 136 is laterally intermediate and in close fit with the planar first surface 124 (FIG. 4) and the planar second surface 126 for inhibiting lateral movement of the spring 136 (e.g., for inhibiting lateral translation of the spring 136 and/or pivoting of the spring 136 about a horizontal axis parallel to the axis 108). This may help maintain a proper orientation of the spring 136 and may help reduce lateral movement of the spring 136 relative to, for example, connectors having a spring positioned in a cylindrical bore.

Referring again to FIGS. 3 and 4, in the example illustrated, each of the planar first surface 124 and the planar second surface 126 extends continuously from the first entry 118 to the second entry 120. Referring to FIGS. 3 and 5, in the example illustrated, the chamber 116 is bounded from below by a floor surface 138, and each of the planar first surface 124 and the planar second surface 126 extends continuously from the floor surface 138 to the second entry 120. Referring to FIGS. 3, 4 and 5, in the example illustrated, the chamber 116 is bounded from above by a ceiling surface 160, which is axially intermediate the first entry 118 and the second entry 120. Referring to FIG. 6, in the example illustrated, a topside of the lever 128 includes a groove 162 between the tab 130 and the latch 132, and a pivoting edge 164 is within the groove 162. The pivoting edge 164 engages the ceiling surface 160 of the body 106 (shown in FIG. 1) and permits the lever 128 to pivot between the lock position and the release position.

Referring again to FIG. 1, in the example illustrated, the floor surface 138 is generally planar, and the spring 136 includes a flat base 140 that is generally parallel and in engagement with the floor surface 138. The spring 136 further includes an arm 142 extending from the base 140 for pushing the lever 128 toward the lock position.

In the example illustrated, the spring 136 is held vertically captive between the floor surface 138 and an underside of the lever 128. In the example illustrated, the chamber is bounded axially by an endwall surface 144 axially opposite the first entry 118, and the spring 136 is held axially captive between the endwall surface 144 and the lever 128.

Referring to FIGS. 4 and 5, in the example illustrated, the chamber 116 comprises a passage 146 extending axially into the body 106 from the first entry 118 toward the rear end 112 of the body 106. In the example illustrated, the passage 146 extends along the axis 108 from the first entry 118 to the endwall surface 144. In the example illustrated, the passage 146 is bounded laterally by the planar first and second surfaces 124, 126, axially by the endwall surface 144, and from below by the floor surface 138. In the example illustrated, the passage 146 has a generally rectangular cross section that is orthogonal to the axis 108. In the example illustrated, the cross section is generally constant along the axis 108. The passage 146 can be formed using, for example, a broaching process.

Referring to FIG. 3, in the example illustrated, the second entry 120 comprises a slot extending radially into the body 106 from the outer surface 114 to the passage 146.

Referring to FIG. 5, in the example illustrated, the planar first surface 124 and the planar second surface 126 are spaced apart from one another by a chamber width 148. In the example illustrated, the planar first surface 124 and the planar second surface 126 are generally parallel with one another, and the chamber width 148 is generally constant along the axis 108.

Referring to FIG. 6A, in the example illustrated, the central portion 134 of the lever 128 has laterally opposite lever outer surfaces 152a, 152b. In the example illustrated, the lever outer surfaces 152a, 152b are generally planar and directed toward the planar first and second surfaces 124, 126, respectively, and can engage the planar first and second surfaces 124, 126 for inhibiting lateral movement of the lever 128.

In the example illustrated, the lever 128 has a lever lateral extent 154 between the lever outer surfaces 152a, 152b. In some examples, the lever lateral extent 154 can be at least 80% of the chamber width 148. In some examples, the lever lateral extent 154 can be at least 90% of the chamber width 148. In the example illustrated, the lever lateral extent 154 is about 94% of the chamber width 148.

In the example illustrated, the spring 136 has laterally opposite spring outer surfaces 156a, 156b. In the example illustrated, each of the spring outer surfaces 156a, 156b extends along the base 140 and the arm 142 of the spring 136. In the example illustrated, the spring outer surfaces 156a, 156b are directed toward the planar first and second surfaces 124, 126, respectively, and can engage the planar first and second surfaces 124, 126 for inhibiting lateral movement of the spring 136.

In the example illustrated, the spring 136 has a spring lateral extent 158 between the spring outer surfaces 156a, 156b. In some examples, the spring lateral extent 158 is at least 80% of the chamber width 148. In some examples, the spring lateral extent 158 can be at least 85% of the chamber width 148. In the example illustrated, the spring lateral extent 158 is about 89% of the chamber width 148.

In the present disclosure, the connector is described in related to interlocking first and second scaffolding components. However, it should be appreciated that the connector may be useful for interconnecting other components that are unrelated to scaffolding or other supporting structures for building forms.

While the above description provides examples of one or more apparatuses or methods, it will be appreciated that other apparatuses or methods may be within the scope of the accompanying claims.

We claim:

1. A connector for interlocking components, the connector comprising:
 a body extending along a longitudinal axis, the body comprising a front surface, a rear end axially opposite the front surface for mounting to a first component, a radially outer surface extending along the axis between the front surface and the rear end for supporting a second component, and an internal chamber having a first entry open axially to the front surface and a second entry open radially to the outer surface, the chamber is bounded axially by an endwall surface axially opposite the first entry, the chamber bounded laterally by a planar first surface and a planar second surface spaced laterally apart from the planar first surface, the planar first surface and the planar second surface are parallel with one another, the chamber bounded from below by a planar floor surface opposite the second entry, and the chamber bounded from above by a planar ceiling surface that extends axially from the first entry to the second entry;
 a lever seated in the chamber, the lever comprising a tab projecting out from the first entry and a latch adjacent the second entry, the tab movable relative to the body for pivoting the lever between a lock position in which the latch projects radially out from the second entry for retaining the second component axially intermediate the latch and the rear end of the body, and a release position in which the latch is retracted into the chamber for permitting sliding of the second component past the latch, the lever comprising a central portion extending through the chamber between the tab and the latch, the central portion laterally intermediate and adjacent the planar first and second surfaces for inhibiting lateral movement of the lever, a topside of the lever comprising a groove between the tab and the latch, and a pivoting edge extending laterally within the groove between first and second outer surfaces of the lever, the pivoting edge linearly engaging the ceiling surface of the body and permitting the lever to pivot between the lock and release positions; and
 a spring seated in the chamber for biasing the lever into the lock position, the spring laterally intermediate and adjacent the planar first and second surfaces for inhibiting lateral movement of the spring, the spring comprising a flat base in engagement with and extending along the floor surface parallel with the axis between a first end positioned toward the lever and a second end spaced rearwardly from the first end toward the rear end of the body, the spring comprising an arm extending from the second end of the flat base upwardly and forwardly toward the lever engaging an underside thereof and pushing the lever toward the lock position, and the spring is held axially captive between and is in engagement with the endwall surface and the underside of the lever,
 wherein the planar first and second surfaces act as opposing sidewalls to guide movement of the lever and the spring between the lock and release positions and maintain proper orientation of each.

2. The connector of claim 1, wherein each of the planar first surface and the planar second surface extends continuously from the first entry to the second entry.

3. The connector of claim 2, wherein each of the planar first surface and the planar second surface extends continuously from the floor surface to the second entry.

4. The connector of claim 3, wherein the chamber comprises a passage extending axially into the body from the first entry toward the rear end of the body, the passage bounded laterally by the planar first and second surfaces, and the passage bounded vertically by the floor and ceiling surfaces.

5. The connector of claim 4, wherein the passage has a rectangular cross section that is orthogonal to the axis.

6. The connector of claim 5, wherein the cross section is constant along the axis.

7. The connector of claim 1, wherein the planar first surface and the planar second surface are spaced laterally apart from one another by a chamber width, the central portion of the lever has a lever lateral extent between laterally opposite lever outer surfaces, and the lever lateral extent is at least 80% of the chamber width.

8. The connector of claim 7, wherein the lever lateral extent is at least 90% of the chamber width.

9. The connector of claim 7, wherein the planar first surface and the planar second surface are spaced laterally apart from one another by a chamber width, the spring has a spring lateral extent between laterally opposite spring outer surfaces, and the spring lateral extent is at least 80% of the chamber width.

10. The connector of claim 9, wherein the spring lateral extent is at least 85% of the chamber width.

11. A connector, comprising:
 a body extending along a longitudinal axis, the body comprising a front surface, a rear end axially opposite the front surface, a radially outer surface extending between the front surface and the rear end, and an internal chamber having a first entry open axially to the front surface and a second entry open radially to the outer surface, the chamber bounded laterally by a planar first surface and a planar second surface spaced laterally apart from the first surface, the chamber bounded from below by a planar floor surface opposite the second entry, the chamber bounded from above by a planar ceiling surface that extends axially from the first entry to the second entry, the first, second, floor and ceiling surfaces together defining a rectangular cross section that is orthogonal to the axis;
 a lever seated in the chamber, the lever comprising a tab projecting out from the first entry and a latch adjacent the second entry, the lever pivotable relative to the body between a lock position in which the latch projects radially out from the second entry and a release position in which the latch is retracted into the chamber, the lever comprising a topside and an underside, the topside of the lever comprising a groove between the tab and the latch, and a pivoting edge that extends laterally within the groove between outer surfaces of the lever, the pivoting edge linearly engaging the ceiling surface of the body forming a fulcrum for the lever to pivot between the lock and release positions; and
 a spring seated in the chamber for biasing the lever into the lock position, the spring comprising a flat base in engagement with the floor surface parallel with the axis and an arm extending from a rear end of the flat base upwardly and forwardly toward the lever engaging an underside thereof and pushing the underside of the lever toward the lock position, wherein the first and second surfaces act as opposing sidewalls to inhibit lateral movement of the lever and the spring and guide the lever and the spring between the lock and release positions.

\* \* \* \* \*